(12) United States Patent
Hirota

(10) Patent No.: US 7,983,190 B2
(45) Date of Patent: Jul. 19, 2011

(54) NETWORK SYSTEM, LAYER 3 COMMUNICATION DEVICE, LAYER 2 COMMUNICATION DEVICE, AND ROUTE SELECTION METHOD

(75) Inventor: Masaki Hirota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 900 days.

(21) Appl. No.: 11/226,406

(22) Filed: Sep. 15, 2005

(65) Prior Publication Data

US 2006/0209895 A1 Sep. 21, 2006

(30) Foreign Application Priority Data

Mar. 15, 2005 (JP) ................................. 2005-073477

(51) Int. Cl.
*H04L 12/28* (2006.01)
(52) U.S. Cl. ........ 370/254; 370/256; 370/389; 370/400; 370/401; 370/404
(58) Field of Classification Search .................. 370/254, 370/252, 400, 469, 392, 401, 352, 216, 389, 370/256, 419, 395.53, 218, 219, 222, 224, 370/225, 404, 408, 475; 709/226, 238, 230, 709/236, 242, 249; 379/112.04
See application file for complete search history.

(56) References Cited

U.S. PATENT DOCUMENTS

| | | | |
|---|---|---|---|
| 6,711,152 B1 * | 3/2004 | Kalmanek et al. | 370/351 |
| 6,944,159 B1 * | 9/2005 | Fotedar et al. | 370/392 |
| 6,963,575 B1 * | 11/2005 | Sistanizadeh et al. | 370/404 |
| 6,999,452 B1 * | 2/2006 | Drummond-Murray et al. | 370/389 |
| 7,061,876 B2 | 6/2006 | Ambe | |
| 7,079,537 B1 * | 7/2006 | Kanuri et al. | 370/392 |
| 7,376,135 B2 * | 5/2008 | Beck | 370/392 |
| 7,428,237 B1 * | 9/2008 | Gai et al. | 370/395.53 |
| 7,599,284 B1 * | 10/2009 | Di Benedetto et al. | 370/216 |
| 7,808,968 B1 * | 10/2010 | Kalmanek et al. | 370/351 |
| 2001/0049739 A1 * | 12/2001 | Wakayama et al. | 709/230 |
| 2002/0046271 A1 * | 4/2002 | Huang | 709/223 |

(Continued)

FOREIGN PATENT DOCUMENTS

JP 11-205369 A 7/1999

(Continued)

OTHER PUBLICATIONS

"Media Access Control (MAC) Bridges", [online], Jun. 2004, retrieved from the Internet: <URL:http://standards.ieee.org/getieee802/download/802.1D-2004.pdf>.

(Continued)

*Primary Examiner* — Aung S Moe
*Assistant Examiner* — Abdullah Riyami
(74) *Attorney, Agent, or Firm* — Fujitsu Patent Center

(57) ABSTRACT

In a layer 2 communication device included in multiple layer 2 networks, an identifying unit identifies a layer 3 control packet from among packets passing through, and an embedding unit embeds routing control information for the layer 2 network in the layer 3 control packet. In a layer 3 communication device connected to the multiple layer 2 networks, a selecting unit selects from the multiple layer 2 networks, an optimum L2 network, that is a layer 2 network forming an optimum communication route, based on a communication destination, and a setting unit sets a packet to be transmitted to the optimum L2 network.

6 Claims, 13 Drawing Sheets

U.S. PATENT DOCUMENTS

| | | | |
|---|---|---|---|
| 2002/0120720 A1* | 8/2002 | Moir | 709/220 |
| 2002/0133534 A1* | 9/2002 | Forslow | 709/200 |
| 2002/0156919 A1* | 10/2002 | Maeno | 709/238 |
| 2003/0152075 A1* | 8/2003 | Hawthorne, III et al. | 370/389 |
| 2003/0172177 A1* | 9/2003 | Kersley et al. | 709/236 |
| 2003/0179707 A1* | 9/2003 | Bare | 370/235 |
| 2004/0032868 A1* | 2/2004 | Oda et al. | 370/389 |
| 2004/0076163 A1* | 4/2004 | Ikeda | 370/395.53 |
| 2004/0156371 A1* | 8/2004 | Kumar et al. | 370/401 |
| 2004/0196843 A1* | 10/2004 | Zinin | 370/389 |
| 2005/0063321 A1* | 3/2005 | Imai | 370/256 |
| 2005/0066036 A1* | 3/2005 | Gilmartin | 709/226 |
| 2005/0078656 A1* | 4/2005 | Bryant et al. | 370/351 |
| 2005/0083949 A1* | 4/2005 | Dobbins et al. | 370/395.53 |
| 2005/0198215 A1* | 9/2005 | Helmerich | 709/220 |
| 2005/0207411 A1* | 9/2005 | Ota et al. | 370/389 |
| 2005/0210077 A1* | 9/2005 | Balakrishnan et al. | 707/200 |
| 2005/0210098 A1* | 9/2005 | Nakamichi et al. | 709/203 |
| 2005/0213558 A1* | 9/2005 | Levit et al. | 370/351 |
| 2005/0232254 A1* | 10/2005 | Korner | 370/360 |
| 2005/0232263 A1* | 10/2005 | Sagara | 370/389 |
| 2005/0259597 A1* | 11/2005 | Benedetto et al. | 370/254 |
| 2006/0002370 A1* | 1/2006 | Rabie et al. | 370/351 |
| 2006/0007865 A1* | 1/2006 | White et al. | 370/238 |
| 2006/0007939 A1* | 1/2006 | Elangovan | 370/395.53 |
| 2006/0010249 A1* | 1/2006 | Sabesan et al. | 709/238 |
| 2006/0013171 A1* | 1/2006 | Ahuja et al. | 370/338 |
| 2006/0050719 A1* | 3/2006 | Barr et al. | 370/401 |
| 2006/0087969 A1* | 4/2006 | Santiago et al. | 370/229 |
| 2006/0089988 A1* | 4/2006 | Davie et al. | 709/225 |
| 2006/0090008 A1* | 4/2006 | Guichard et al. | 709/246 |
| 2006/0114906 A1* | 6/2006 | Bowes et al. | 370/392 |
| 2006/0198323 A1* | 9/2006 | Finn | 370/256 |
| 2006/0209840 A1* | 9/2006 | Paatela et al. | 370/395.7 |
| 2007/0041373 A1* | 2/2007 | Lor et al. | 370/356 |
| 2007/0058535 A1* | 3/2007 | Bichot et al. | 370/230 |
| 2007/0140128 A1* | 6/2007 | Klinker et al. | 370/238 |
| 2007/0268821 A1* | 11/2007 | Levit et al. | 370/223 |
| 2008/0084890 A1* | 4/2008 | Kompella | 370/400 |
| 2008/0114887 A1* | 5/2008 | Bryers et al. | 709/230 |
| 2009/0213859 A1* | 8/2009 | De Silva et al. | 370/395.53 |
| 2009/0268613 A1* | 10/2009 | Sagfors | 370/235 |
| 2009/0323694 A1* | 12/2009 | Miki et al. | 370/392 |

FOREIGN PATENT DOCUMENTS

| | | |
|---|---|---|
| JP | 2003-087290 A | 3/2003 |
| JP | 2003-092671 A | 3/2003 |
| JP | 2004-080323 A | 3/2004 |
| JP | 2004-248085 A | 9/2004 |
| JP | 2004-320794 A | 11/2004 |

OTHER PUBLICATIONS

"Current in-house LAN that is learned in Cisco 'Catalyst 3750'", Network Magazine, ASCII Corporation, Dec. 1, 2004, pp. 150-153, Partial English Translation.

Nasuno, Yoichi et al., "RSTP in which latency is reduced, solving problem in spanning trees", Nikkei Byte, Nikkei Business Publications, Inc. May 22, 2003, pp. 104-109, Partial English Translation.

Japanese Office Action corresponding to Japanese application No. 2005-073477, mailed by JPO on Apr. 6, 2010, with partial English translation.

Office Action, Japan Patent Office, mailed Jan. 5, 2010, in connection with corresponding JP patent application No. 2005-073477.

* cited by examiner

FIG.3

| command (1) | version (1) | must be zero (2) |
|---|---|---|
| address family identifier (2) || Route Tag (2) |
| IP address (4) |||
| Subnet Mask (4) |||
| Next Hop (4) |||
| metric (4) |||
| . . . |||

NETWORK SYSTEM, LAYER 3 COMMUNICATION DEVICE, LAYER 2 COMMUNICATION DEVICE, AND ROUTE SELECTION METHOD

BACKGROUND OF THE INVENTION

1. Field of the Invention

The present invention relates to a network system, a layer 3 communication device, a layer 2 communication device, and a route selection method that make it possible to always select an optimum route for communication through a layer 2 network.

2. Description of the Related Art

In recent years, a large-scale network is often built as a layer 2 network because, for example, it is relatively inexpensive to install the layer 2 network. In building the layer 2 network, a loop of a packet occurs depending on a connection configuration of layer 2 switches (layer 2 communication devices). This leads to a phenomenon called broadcast storm, in which a network collapses.

To avoid the broadcast storm, it is necessary to establish a connection form of the layer 2 switches in a tree structure physically or logically. In a system generally adopted, layer 2 switches are connected in a form of a mesh or a ring physically, and a part of a network is blocked logically to establish a tree structure. In this system, when a fault occurs, it is possible to maintain communication connection by removing a block or moving a position of the block, thereby realizing high redundancy.

To block a part of a layer 2 network, a control protocol such as a Spanning Tree Protocol (STP) may be used. By running such a control protocol on the layer 2 switches, it is possible to cause the layer 2 switches to set a logical block autonomously. The STP is defined in "Media Access Control (MAC) Bridges", [online], June 2004, retrieved from the Internet: <URL: http://standards.ieee.org/getieee802/download/802.1D-2004.pdf>.

FIG. 13 is a diagram of the layer 2 network. Layer 2 switches (L2SW) $1000a$ to $1000c$ are connected to one another physically to constitute the layer 2 network. The layer 2 switch $1000a$ is connected to an Internet Protocol (IP) network $3000a$ through a router (a layer 3 communication device) $2000a$. Similarly, the layer 2 switch $1000b$ is connected to an IP network $3000b$ through a router $2000b$. The layer 2 switch $1000c$ is connected to an IP network $3000c$ through a router $2000c$.

It is assumed here that data is transmitted from the IP network $3000a$ to the IP network $3000c$. In this case, a packet for transmitting the data passes through the layer 2 network. Because the layer 2 switches $1000a$ to $1000c$ are connected in a form of a ring, it is likely that the packet goes into a loop. Thus, a logical block is set in a part of the network (in this example, between the layer 2 switches $1000b$ and $1000c$) such that the packet cannot pass through the blocked part.

However, when part of the network is blocked, communication through the layer 2 network is not performed on an optimum route. In the example shown in FIG. 13, communication between the IP networks $3000a$ and $3000b$ and communication between the IP networks $3000a$ and $3000c$ are performed on an optimum route. However, since communication between the IP networks $3000b$ and $3000c$ is performed on a route through the layer 2 switch $1000a$, the communication is not performed on an optimum route.

In this example, a band between the layer 2 switches $1000b$ and $1000c$ is not used effectively. Communication, which should actually be performed between the layer 2 switches $1000b$ and $1000c$, consumes a band between the layer 2 switches $1000a$ and $1000b$ and a band between the layer 2 switches $1000a$ and $1000c$.

SUMMARY OF THE INVENTION

It is an object of the present invention to at least solve the problems in the conventional technology.

According to one aspect of the present invention, a network system includes a layer 2 communication device that is included in multiple layer 2 networks; and a layer 3 communication device that performs communication through the multiple layer 2 networks. The layer 2 communication device includes an identifying unit that identifies a layer 3 control packet from among packets passing through the layer 2 communication device; and an embedding unit that embeds routing control information for the layer 2 network in the layer 3 control packet. The layer 3 communication device includes a selecting unit that selects from the multiple layer 2 networks, an optimum L2 network, that is a layer 2 network forming an optimum communication route, based on the routing control information for the layer 2 network embedded in the layer 3 control packet; and a setting unit that sets a packet to be transmitted to the optimum L2 network.

According to another aspect of the present invention, a layer 3 communication device connected to multiple layer 2 networks includes a selecting unit that selects from the multiple layer 2 networks, an optimum L2 network, that is a layer 2 network forming an optimum communication route, based on a communication destination; and a setting unit that sets a packet to be transmitted to the optimum L2 network.

According to still another aspect of the present invention, a layer 2 communication device that is included in a layer 2 network includes an identifying unit that identifies a layer 3 control packet from among packets passing through the layer 2 communication device; and an embedding unit that embeds routing control information for the layer 2 network in the layer 3 control packet.

According to still another aspect of the present invention, a method for a network system that includes a layer 2 communication device that is included in multiple layer 2 networks, and a layer 3 communication device that performs communication through the multiple layer 2 networks includes identifying, performed by the layer 2 communication device, a layer 3 control packet from among packets passing through the layer 2 communication device; embedding, performed by the layer 2 communication device, routing control information for the layer 2 network in the layer 3 control packet; selecting, performed by the layer 3 communication device, from the multiple layer 2 networks, an optimum L2 network, that is a layer 2 network forming an optimum communication route, based on the routing control information for the layer 2 network embedded in the layer 3 control packet; and setting, performed by the layer 3 communication device, a packet to be transmitted to the optimum L2 network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of a format of an update message of the RIP;

DETAILED DESCRIPTION OF THE PREFERRED EMBODIMENTS

Exemplary embodiments of the invention are explained in detail below with reference to the accompanying drawings.

A route selection system according to an embodiment of the invention adopts a method of setting Virtual Local Area Networks (VLANs) among layer 2 networks to make the layer 2 networks multiple, and setting a block in a different position in each of the VLANs. This method can be realized by, for example, using a Multiple Spanning Tree Protocol (MSTP).

Figure 1:
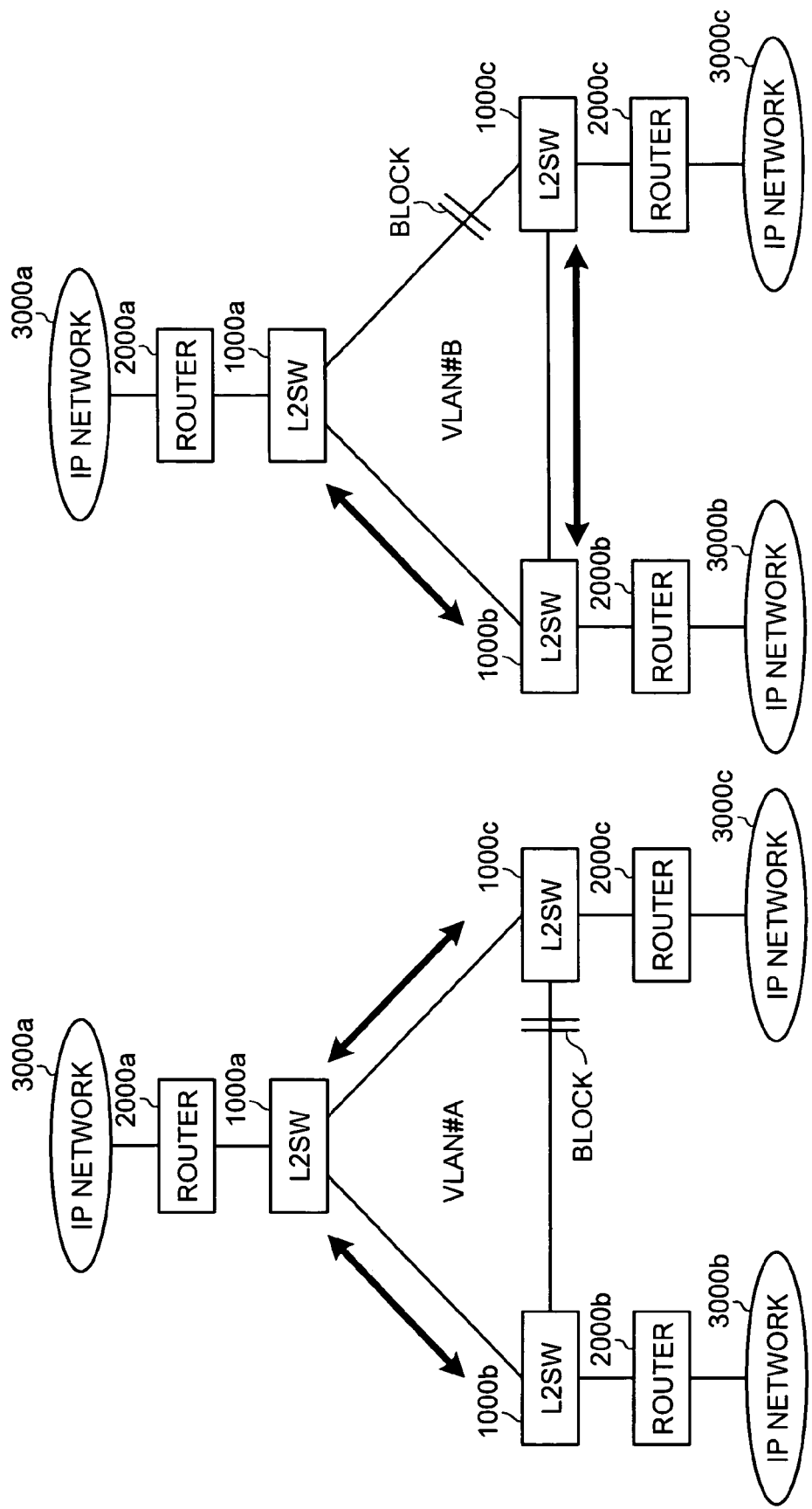
FIG. 1 is a diagram to explain a communication route in multiple layer 2 networks.
Figure 13:
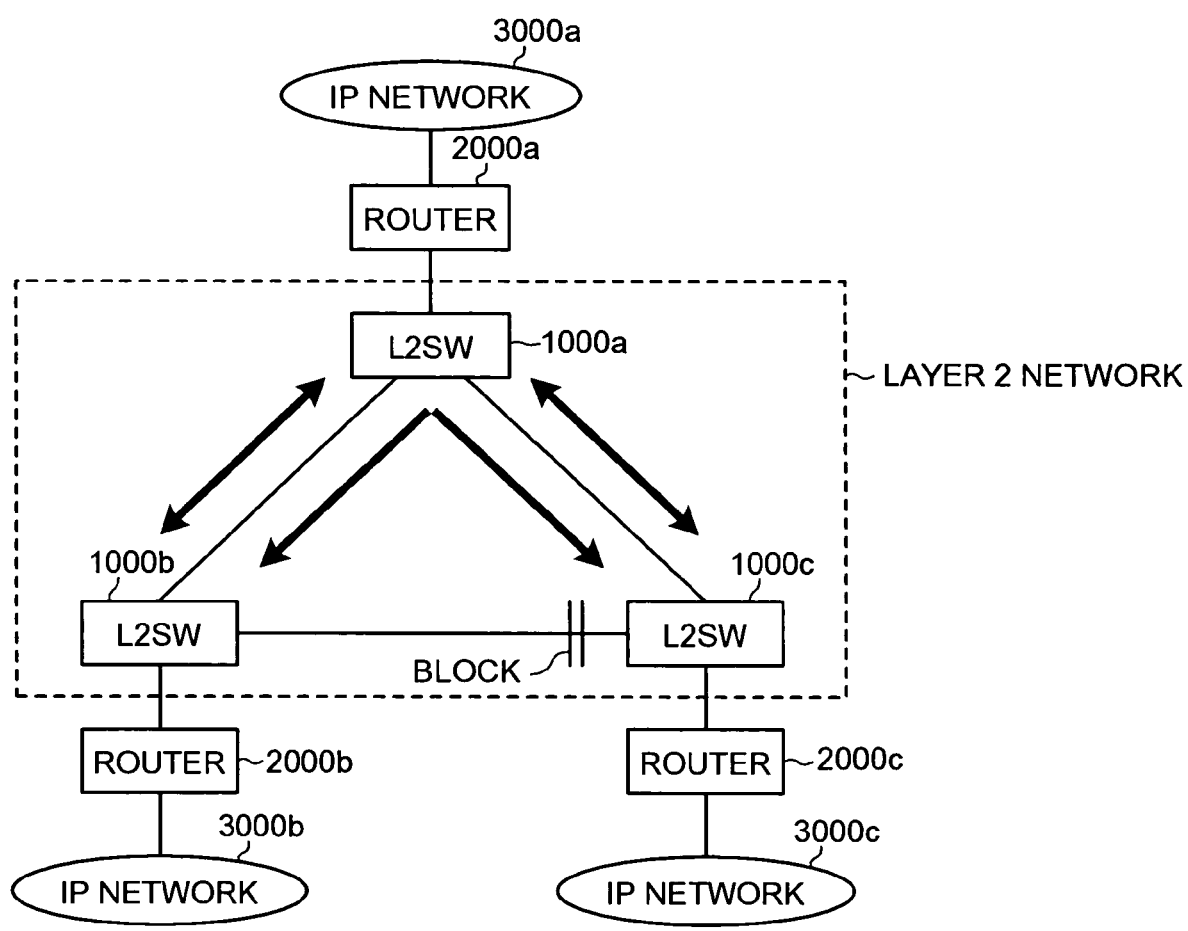
FIG. 13 is a diagram of the layer 2 network.

FIG. 1 is a diagram to explain a communication route in multiple layer 2 networks. In the figure, two VLANs, namely, a VLAN #A and a VLAN #B, are set in the layer 2 network of FIG. 13. In the VLAN #A, a block is set between the layer 2 switches 1000b and 1000c. In the VLAN #B, a block is set between the layer 2 switches 1000a and 1000c.

When communication is performed through the VLAN #A, communication between the IP networks 3000a and 3000b, and communication between the IP networks 3000a and 3000c are performed on an optimum route. However, communication between the IP networks 3000b and 3000c is performed on a route through the layer 2 switch 1000a, which is not an optimum route.

On the other hand, when communication is performed through the VLAN #B, communication between the IP networks 3000a and 3000b, and communication between the IP networks 3000b and 3000c are performed on an optimum route. However, communication between the IP networks 3000a and 3000c is performed on a route through the layer 2 switch 1000a, which is not an optimum route.

Thus, when communication is performed between the IP networks 3000b and 3000c, it is possible to take an optimum route if the VLAN #B is used. Similarly, when communication is performed between the IP networks 3000a and 3000c, it is possible to take an optimum route if the VLAN #A is used. When communication is performed between the IP networks 3000a and 3000b, it is possible to take an optimum route whether the VLAN #A or the VLAN #B is used.

In this way, a plurality of VLANs having different block positions are set on the layer 2 network to control the layer 2 network such that communication is performed through an appropriate VLAN according to a communication route. This makes it possible to always perform communication on an optimum route. However, there are two problems. A first problem is that routers do not have means for designating a VLAN to transmit a packet. A second problem is that the routers do not have means for learning a state of a route of the layer 2 network. If a state of a route of the layer 2 network is unknown, it is not possible to select an optimum route. These problems occur because, since the routers operate in a layer 3, details of a layer 2 are concealed.

The first problem can be solved by additionally providing the routers with a function of adding a VLAN tag to a packet (a frame) to be outputted. Because a usual packet and a packet sent to a VLAN are different only in presence or absence of a VLAN tag, this problem can be solved relatively easily.

To solve the second problem, for example, a network administrator may set and register a state of a route of the layer 2 network in the respective routers. However, a large burden is imposed on the network administrator. Thus, in this embodiment, a layer 2 switch embeds information about the layer 2 network in a control packet exchanged among the routers. The routers are capable of learning a state of a route of the layer 2 network by referring to the information embedded by the layer 2 switch.

Specifically, the layer 2 switch embeds information for routing control in a packet exchanged among the routers. There are two representative systems for the routing control, namely, a Routing Information Protocol (RIP) and an Open Shortest Path First (OSPF). Regardless of whether the routers use the RIP or the OSPF, it is possible to embed the information.

The RIP is a protocol for performing routing control using a control packet called an update message. Every time an update message transmitted from the routers periodically passes through the routers, the number of steps (the number of hops) is incremented by one. Each router stores information on how many steps an update message has, from which router the update message arrives, and through which route the update message arrives. While transmitting data on a route, the router transmits packets to the router having the least number of steps.

In the route selection system according to this embodiment, other than the number of steps of the routers (the number of steps of the layer 3), the number of steps of the layer 2 switch (the number of steps of the layer 2) is recorded in an update message. First, while transmitting an update message through the layer 2 network, a router replicates a packet by the number of VLANs set, and transmits update messages to the respective VLANs one by one. The usual layer 2 switch never operates an area of the layer 2 of the packet received. However, when a packet passing through the own device is an update message, the layer 2 switch according to this embodiment increments the number of steps embedded in a predetermined area of the update message by one, and transfers the update message. A router, which receives the update message, determines a VLAN forming an optimum route, based on the number of steps embedded by the layer 2 switch.

Figure 2:
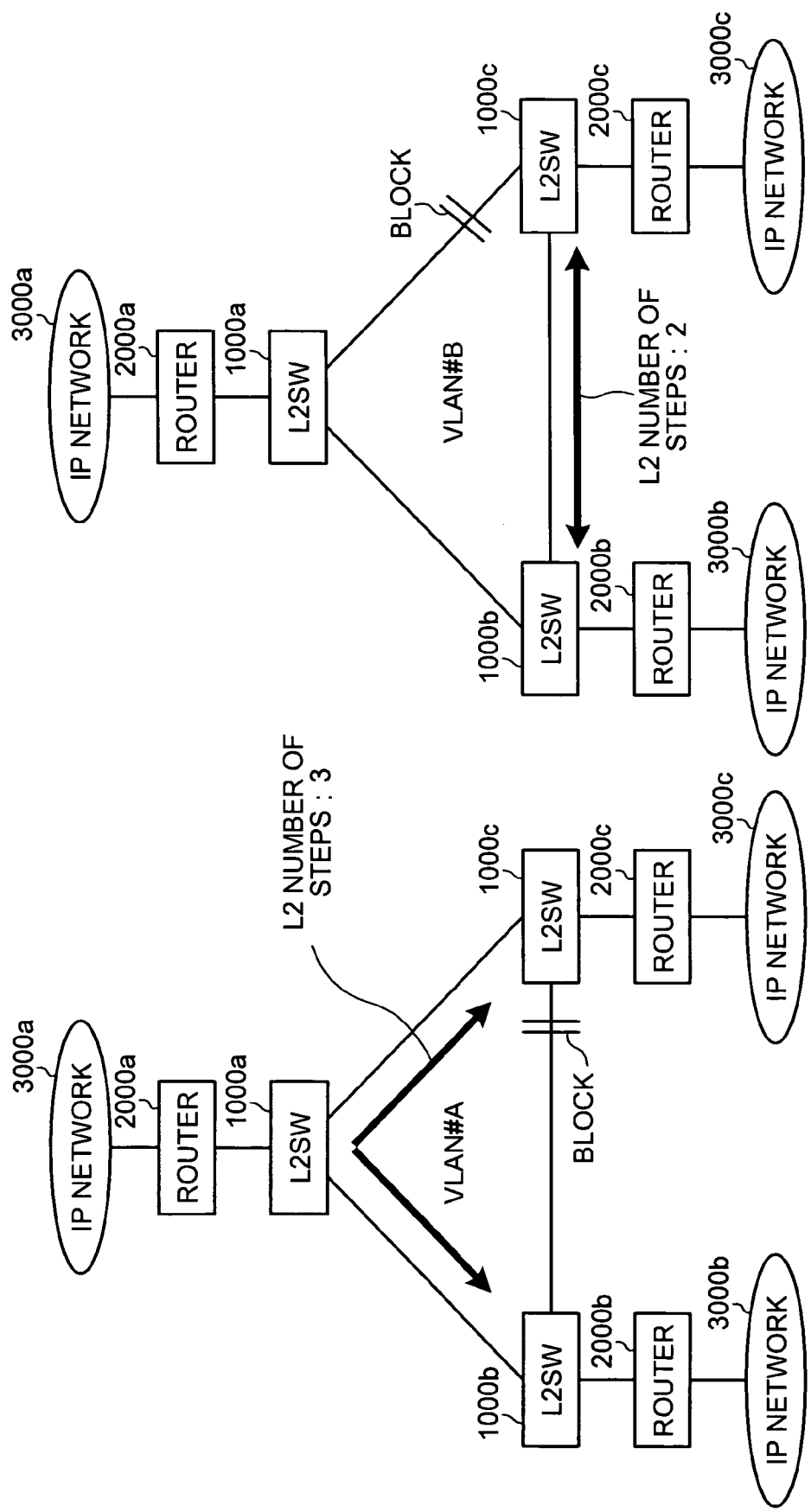
FIG. 2 is a diagram to explain an optimum route selection system using a Routing Information Protocol (RIP)

FIG. 2 is a diagram to explain an optimum route selection system using the RIP. A network constitution in this figure is the same as that shown in FIG. 1. It is assumed that an update message is transmitted from the router 2000b to the router 2000c. The router 2000b transmits the update message through the layer 2 network. Thus, the router 2000b replicates a packet to create two update messages for the VLAN #A and the VLAN #B, and transmits the update messages designating the respective VLANs.

The update message passing through the VLAN #A is transmitted through three layer 2 switches, namely, the layer 2 switches 1000*a*, 1000*b*, and 1000*c*. Every time the update message is transmitted through the layer 2 switches, the number of steps of the layer 2 is incremented. Thus, when the router 2000*c* receives the update message, the number of steps of the layer 2 is set to 3. On the other hand, the update message passing through the VLAN #B is transmitted through two layer 2 switches, namely, the layer 2 switches 1000*a* and 1000*c*. Thus, when the router 2000*c* receives the update message, the number of steps of the layer 2 is set to 2.

The router 2000*c* compares the two update messages received, and determines that the VLAN #B with the smaller number of steps of the layer 2 is an optimum route. When the router 2000*c* transmits a packet in a direction of the router 2000*b*, the router 2000*c* transmits the packet through the VLAN #B. If there are a plurality of routes with the smallest number of steps of the layer 2, for example, the router 2000*c* only has to select a VLAN with a smallest VLAN-ID as the optimum route.

It is possible to embed the number of steps of the layer 2 in, for example, a metric field of an update message. FIG. 3 is a diagram of a format of an update message of the RIP. As shown in the figure, the metric field has a size of 32 bits (4 bytes). Because the maximum number of steps of the layer 3 to be set is fifteen, only low order 5 bits are used. Therefore, it is possible to embed the number of steps of the layer 2 using high order bits of this field.

The OSPF is a protocol with which respective routers advertise to each other, cost values (band information) of their own respective ports as Link State Advertisement (LSA), and perform routing control using this information. Whereas a shortest route is set as an optimum route in the RIP, a route having a widest band is set as an optimum route in the OSPF.

In the route selection system according to this embodiment, a cost value of the layer 2 is embedded in an OSPF control packet for advertising the LSA. First, in transmitting an OSPF control packet through the layer 2 network, a router replicates a packet by the number of VLANs set, and transmits OSPF control packets to the respective VLANs one by one. The usual layer 2 switch never operates an area of the layer 3 of the packet received. However, when a packet passing through the own device is an update message, the layer 2 switch according to this embodiment increments the cost value embedded in a predetermined area of the OSPF control packet by a predetermined value, and transfers the OSPF control packet. A router, which receives the OSPF control packet, determines a VLAN forming an optimum route based on the cost value embedded by the layer 2 switch.

Figure 4:
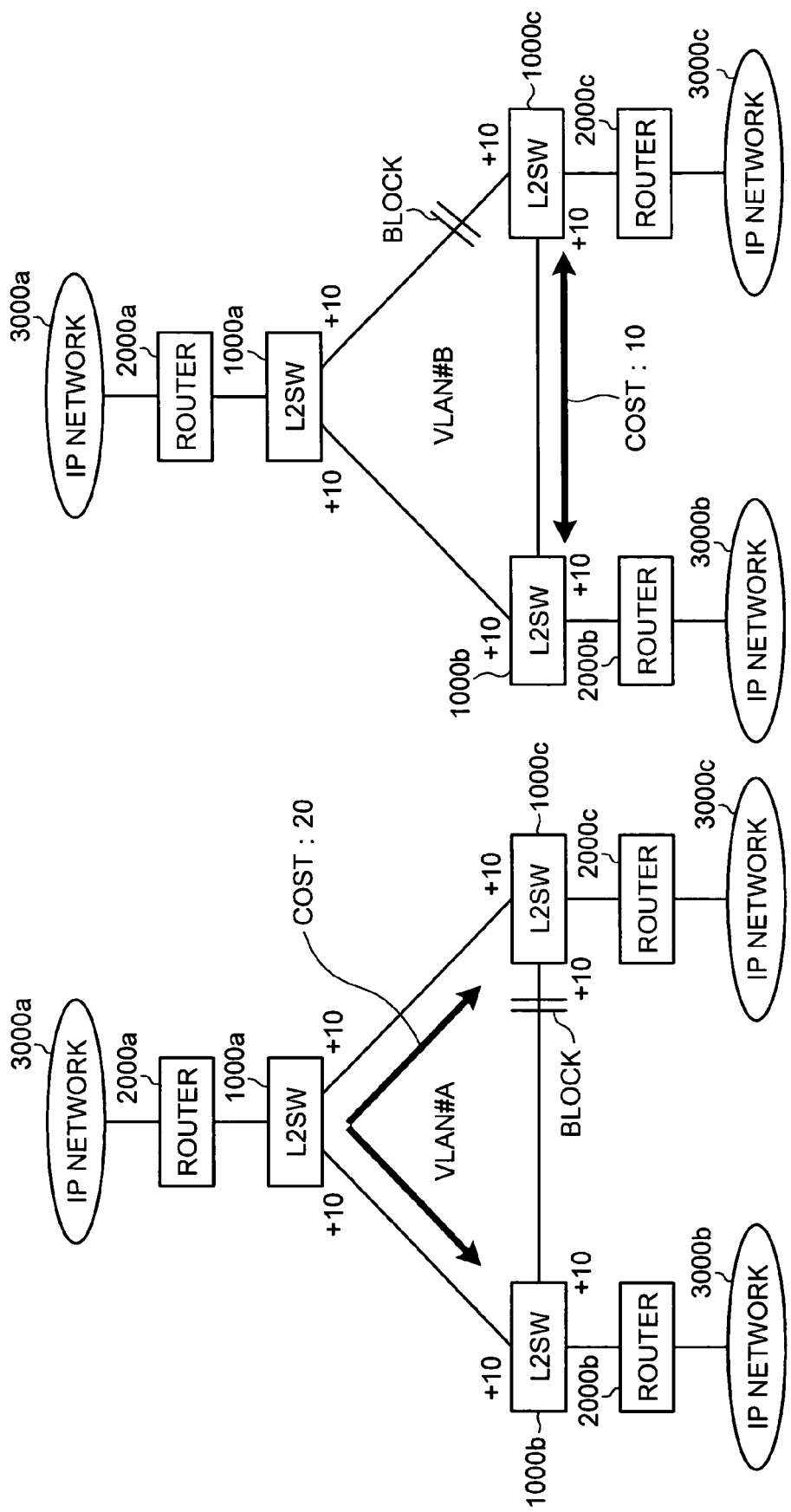
FIG. 4 is a diagram to explain an optimum route selection system using an Open Shortest Path First (OSPF)

FIG. 4 is a diagram to explain an optimum route selection system using the OSPF. A network constitution in this figure is the same as that shown in FIG. 1. It is assumed that an OSPF control packet is transmitted from the router 2000*b* to the router 2000*c*, and a uniform cost value 10 is added in each layer 2 switch. The router 2000*b* transmits the OSPF control packet through the layer 2 network. Thus, the router 2000*b* replicates a packet to create two OSPF control packets for the VLAN #A and the VLAN #B, and transmits the OSPF control packets designating the respective VLANs.

The OSPF control packet passing through the VLAN #A is transmitted through three layer 2 switches, namely, the layer 2 switches 1000*a*, 1000*b*, and 1000*c*. Every time the OSPF control packet is transmitted through an output port, 10 is added as the cost value of the layer 2. Thus, when the router 2000*c* receives the OSPF control packet, the cost value of the layer 2 is set to 20. On the other hand, the OSPF control packet passing through the VLAN #B is transmitted through two layer 2 switches, namely, the layer 2 switches 1000*a* and 1000*c*. Every time the OSPF control packet passes through an output port, 10 is added as the cost value of the layer 2. Thus, when the router 2000*c* receives the OSPF control packet, the cost value of the layer 2 is set to 10.

The router 2000*c* compares the two update messages received, and determines that the VLAN #B with the smaller cost value of the layer 2 is an optimum route. Thus, to transmit a packet in a direction of the router 2000*b*, the router 2000*c* transmits the packet through the VLAN #B.

Figure 5:
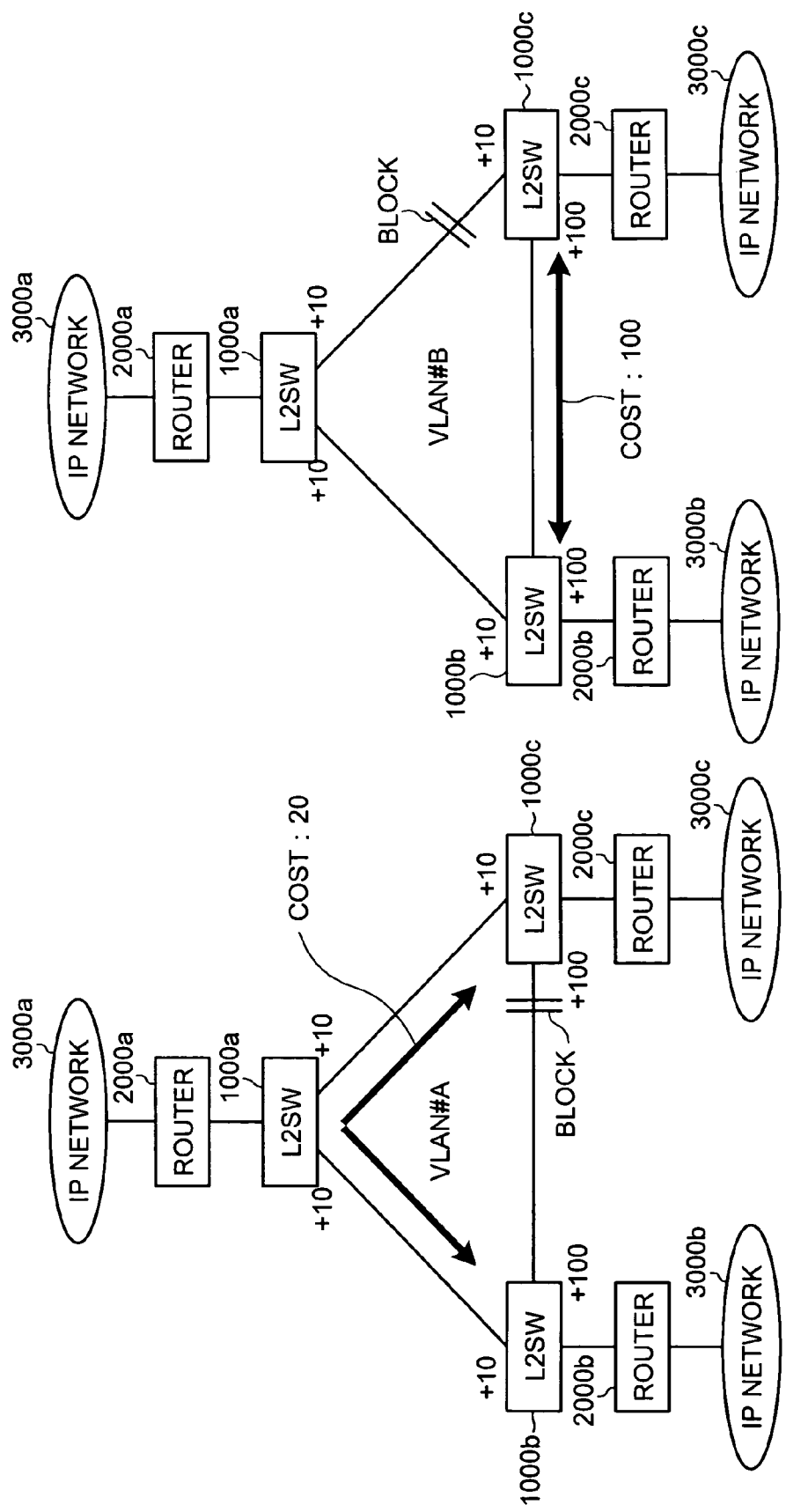
FIG. 5 is a diagram to explain a change in optimum route selection when a cost value is varied.

In the example in FIG. 4, a uniform cost value is added by the layer 2 switch. However, the cost value may be varied according to an input/output direction. FIG. 5 is a diagram to explain a change in optimum route selection when a cost value is varied. As shown in the figure, in this example, the layer 2 switch 1000*b* adds 100 as a cost value to an OSPF control packet inputted and outputted in the direction of the layer 2 switch 1000*c*. The layer 2 switch 1000*c* adds 100 as a cost value to an OSPF control packet inputted and outputted in the direction of the layer 2 switch 100*b*.

It is assumed here that an OSPF control packet is transmitted from the router 2000*b* to the router 2000*c*. A cost value of the layer 2 is set as 20 into a packet passing through the VLAN #A. A cost value of the layer 2 is set as 100, to a packet passing through the VLAN #B. As a result, the router 2000*c* determines that the VLAN #A with a smaller cost value is an optimum route. The optimum route changes from that shown in FIG. 4.

To vary a cost value according to an input/output direction, a cost value, on which a band of an actual route of input/output is reflected, may be set. Alternatively, an intentional value may be set to explicitly instruct an optimum route. In the case of the latter system, by setting an appropriate cost value, it is possible to realize a function of traffic engineering for preventing bias of loads of respective links of a network.

Figure 6:
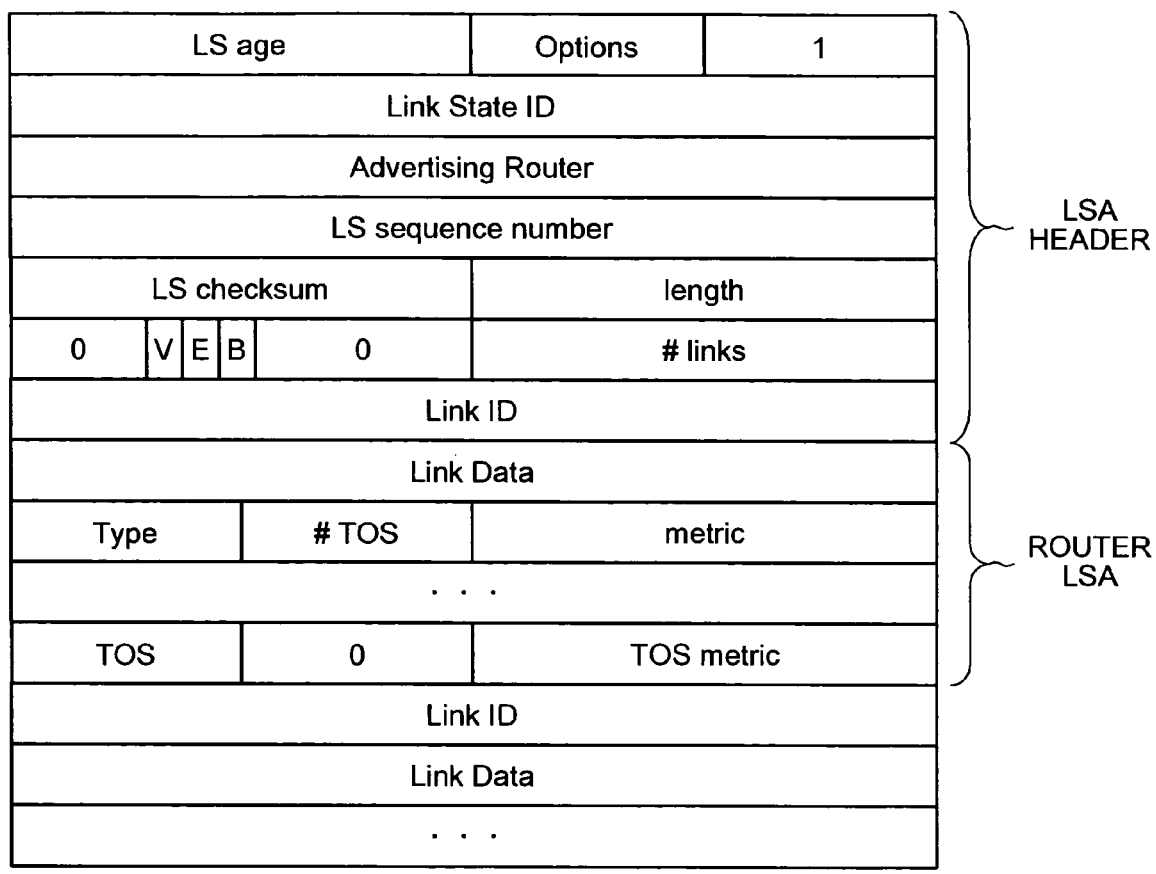
FIG. 6 is a diagram of a format of Link State Advertisement (LSA) information in an OSPF control packet.

Note that it is possible to embed a cost value of the layer 2 in, for example, a metric field of the OSPF control packet. FIG. 6 is a diagram of a format of LSA information in the OSPF control packet. As shown in the figure, LSA information includes an LSA header and a plurality of router LSAs. The metric field is present in each router LSA, and has a size of 16 bits (2 bytes). Only low order 10 bits are substantially used to set a cost value of the layer 3. Therefore, it is possible to embed the cost value of the layer 2 using high order 6 bits of the field. Alternatively, it is also possible to embed the cost value in a TOS metric field that is not used in general.

Figure 7:
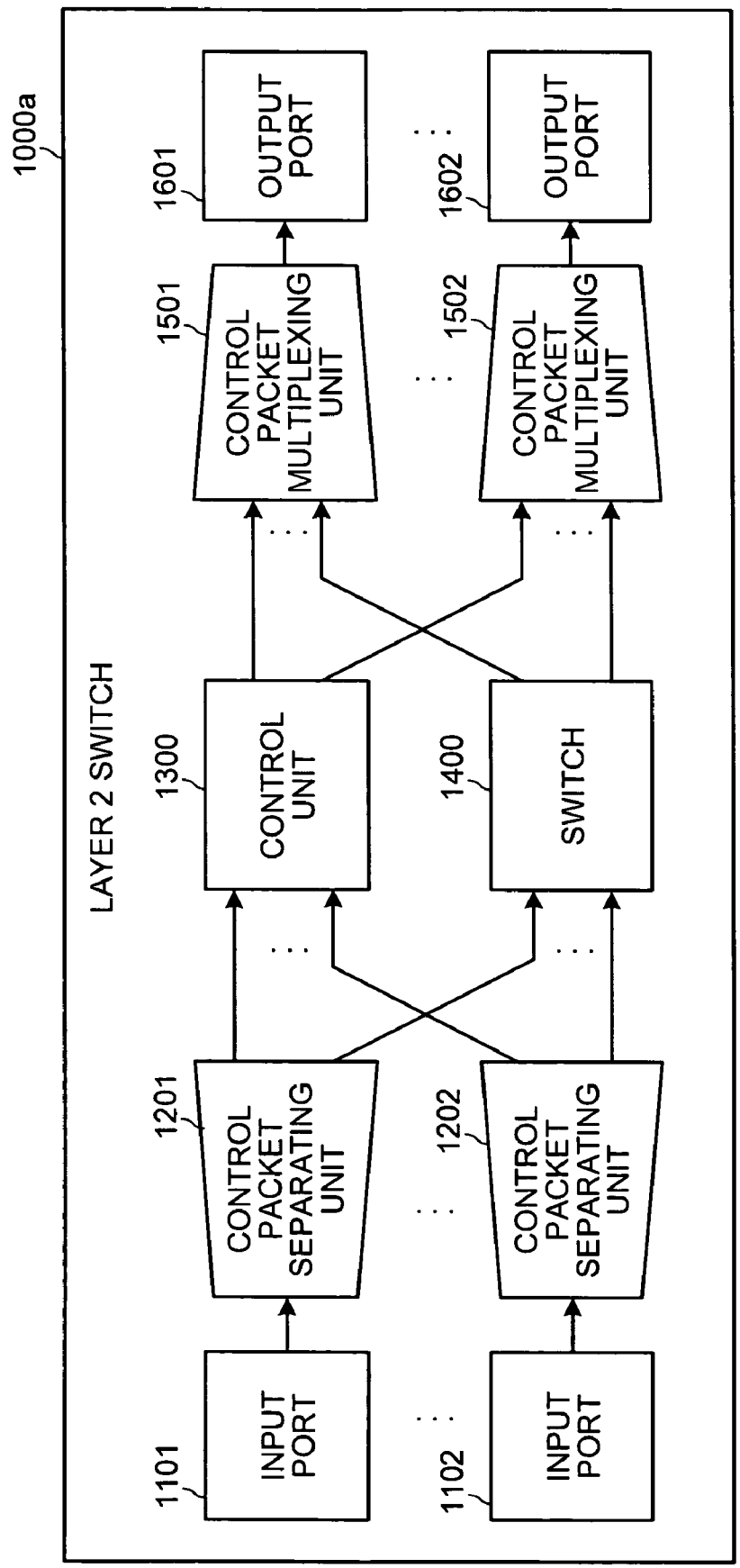
FIG. 7 is a functional block diagram of a layer 2 switch according to an embodiment of the invention.

FIG. 7 is a functional block diagram of the layer 2 switch according to this embodiment. Because the constitution of layer 2 switches 1000*a* to 1000*c* is identical, the layer 2 switch 1000*a* is explained as an example.

As shown in the figure, the layer 2 switch 1000*a* includes input ports 1101 to 1102, control packet separating units 1201 to 1202, a control unit 1300, a switch 1400, control packet multiplexing units 1501 to 1502, and output ports 1601 to 1602. The input ports 1101 to 1102 receive a packet. Although two input ports are shown in the figure, a larger number of input ports may be provided.

The control packet separating units 1201 to 1202 determine whether packets received by the input ports 1101 to 1102 are control packets. If the received packets are control packets, the control packet separating units 1201 to 1202 pass the packets to the control unit 1300. If the received packets are not control packets, the control packet separating units 1201 to 1202 pass the packets to the switch 1400. One control packet separating unit is provided for each input port. In the usual layer 2 switch, a control packet separating unit passes only a layer 2 control packet (e.g., a control packet of the MSTP) to a control unit. However, the control packet separating units 1201 to 1202 also pass a layer 3 control packet (e.g., a control packet of the RIP) to the control unit 1300.

The control unit 1300 processes a control packet. The control unit 1300 mainly performs processing such as routing control to packets identified as control packets by the control packet separating units 1201 to 1202. The control unit 1300 also gives instruction to pass a control packet for which the processing is complete, or a control packet generated anew, to the control packet multiplexing units 1501 to 1502, and then output the control packet from the output ports 1601 to 1602. A detailed constitution of the control unit 1300 is explained separately with reference to FIG. 8.

The switch 1400 outputs packets received from the control packet separating units 1201 to 1202 to an appropriate output port. The control packet multiplexing units 1501 to 1502 multiplex a control packet outputted from the control unit 1300, and a normal packet outputted from the switch 1400. There is one switch for each output port. The output ports 1601 to 1602 transmit packets. Although two output ports are shown in the figure, a larger number of output ports may be provided.

Figure 8:
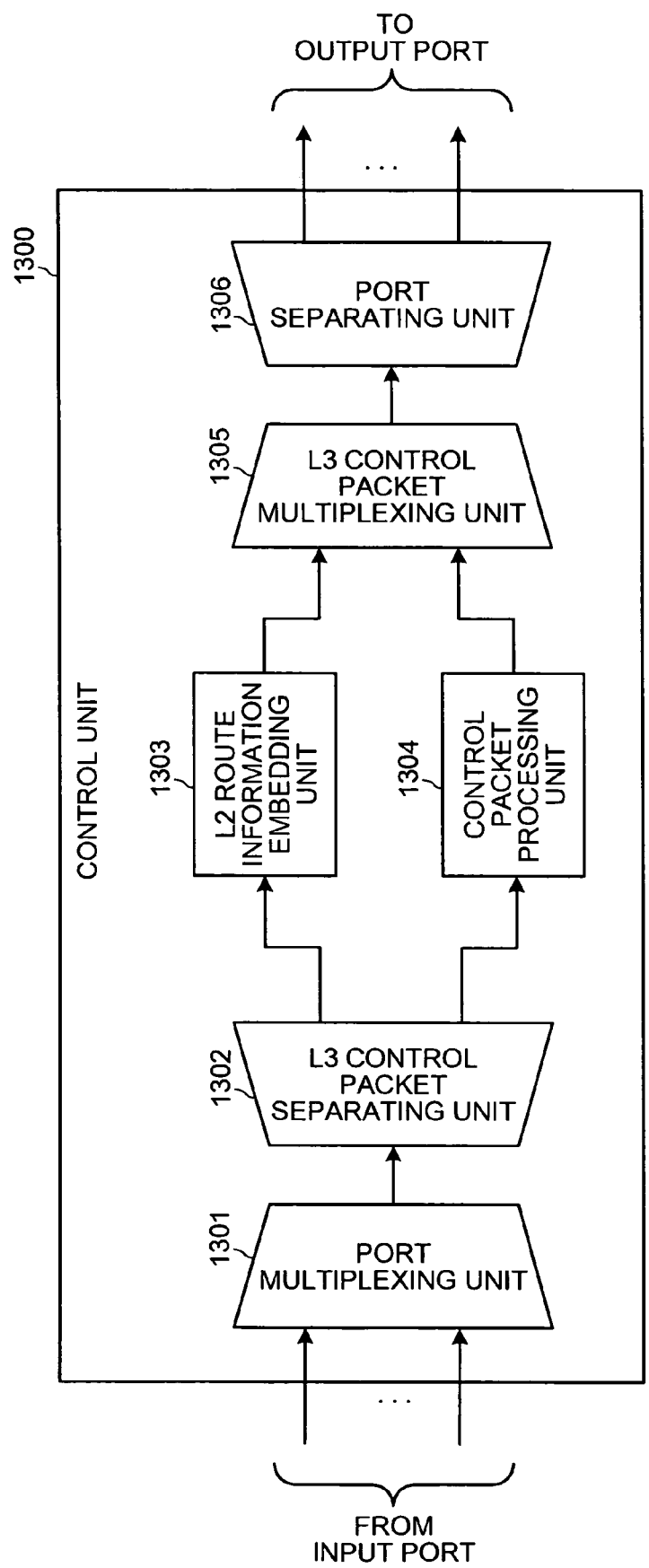
FIG. 8 is a functional block diagram of a control unit shown in FIG. 7.

FIG. 8 is a functional block diagram of the control unit 1300 shown in FIG. 7. As shown in the figure, the control unit 1300 includes a port multiplexing unit 1301, a layer 3 (L3) control packet separating unit 1302, a layer 2 (L2) route information embedding unit 1303, a control packet processing unit 1304, a layer 3 (L3) control packet multiplexing unit 1305, and a port separating unit 1306.

The port multiplexing unit 1301 multiplexes packets received by the input ports 1101 to 1102 and identified as control packets by the control packet separating units 1201 to 1202, and passes the packets to the layer 3 control packet separating unit 1302. The layer 3 control packet separating unit 1302 determines whether the packets passed are layer 3 control packets. If the packets are layer 3 control packets, the layer 3 control packet separating unit 1302 passes the packets to the layer 2 route information embedding unit 1303. If the packets are not layer 3 control packets, the layer 3 control packet separating unit 1302 passes the packets to the control packet processing unit 1304.

The layer 2 route information embedding unit 1303 embeds layer 2 route information such as the number of steps and a cost value in the layer 3 control packets using the system described above. The control packet processing unit 1304 performs route control processing that is performed by the general layer 2 switch. The layer 3 control packet multiplexing unit 1305 multiplexes a packet outputted from the layer 2 route information embedding unit 1303 and a packet outputted from the control packet processing unit 1304. The port separating unit 1306 outputs a packet received from the layer 3 control packet multiplexing unit 1305 to an appropriate output port.

Figure 9:
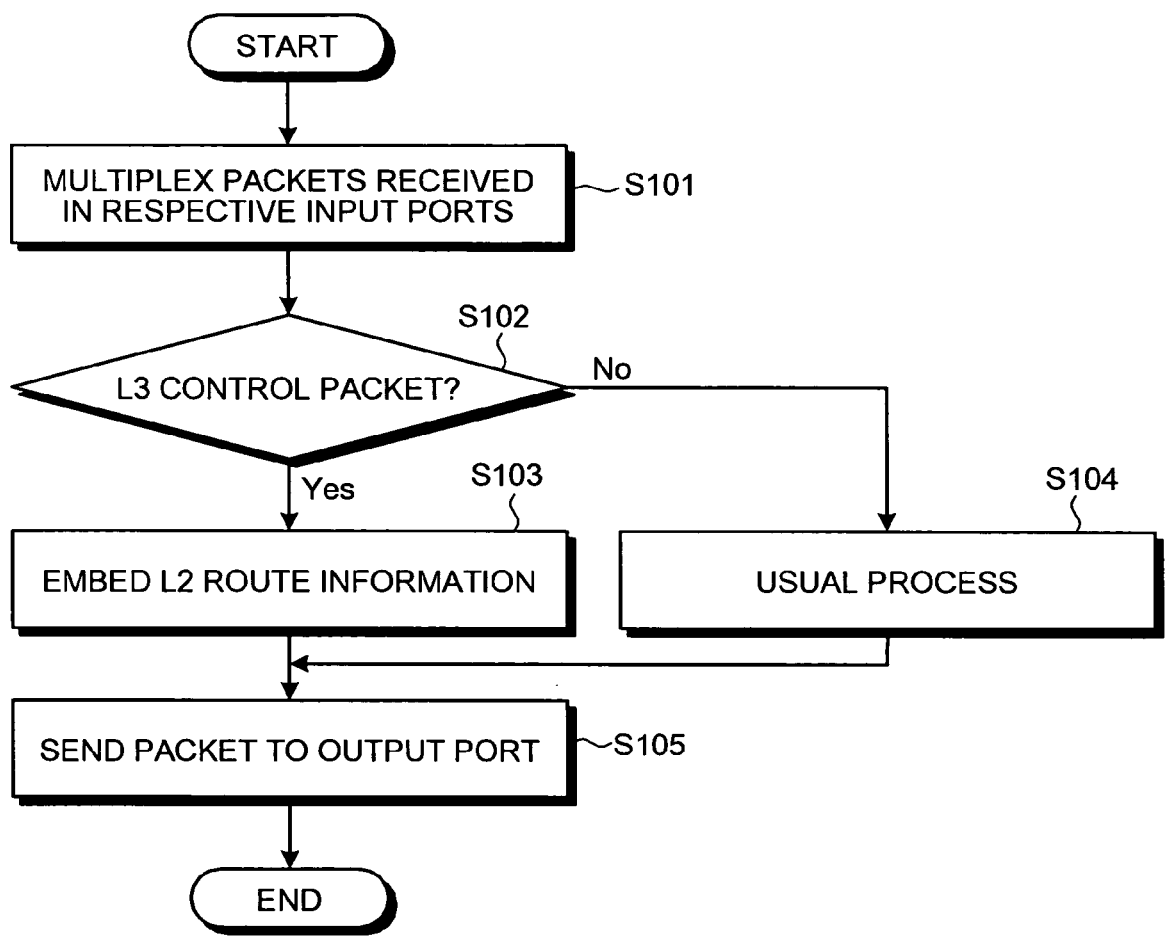
FIG. 9 is a flowchart of a process procedure performed by the control unit shown in FIG. 7.

FIG. 9 is a flowchart of a process procedure performed by the control unit 1300 shown in FIG. 7, when a control packet is received. As shown in the figure, the control unit 1300 multiplexes control packets received by the input ports 1101 to 1102 in the port multiplexing unit 1301 (step S101).

The layer 3 control packet separating unit 1302 in the control unit 1300 determines whether the control packets are layer 3 control packets. If the control packets are the layer 3 control packets ("Yes" at step S102), the control unit 1300 sends the packets to the layer 2 route information embedding unit 1303, to embed the layer 2 route information in the control packets (step S103). If the control packets are not the layer 3 control packets ("No" at step S102), the control packet processing unit 1304 in the control unit 1300 performs usual route control process (step S104).

The control unit 1300 outputs the packets subjected to the process in the layer 2 route information embedding unit 1303 or the control packet processing unit 1304 to an appropriate output port via the port separating unit 1306.

Thus, the layer 2 switches 1000a to 1000c according to this embodiment identify layer 3 control packets passing through, embed the layer 2 route information in the packets, and transfer the packets. The routers 2000a to 2000c use this information to select a VLAN having an optimum route.

Figure 10:
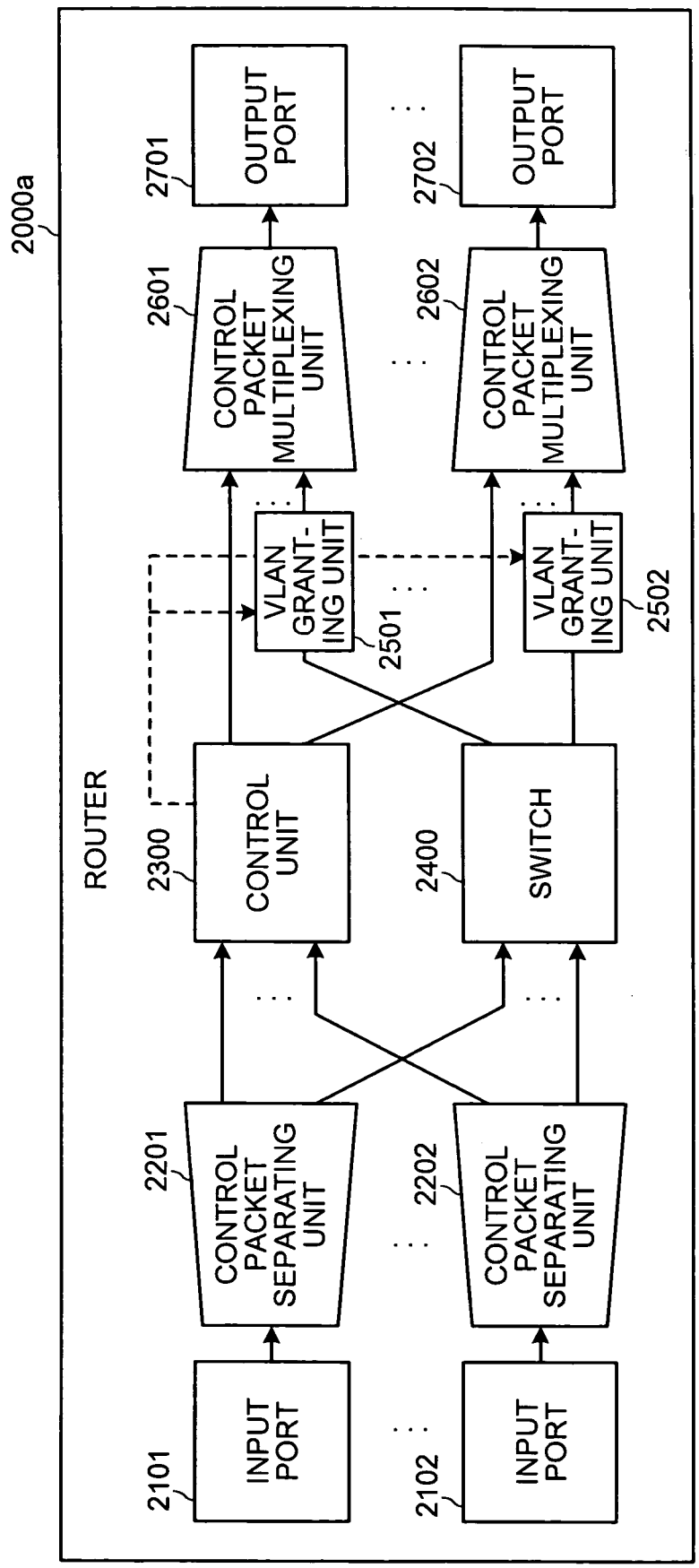
FIG. 10 is a functional block diagram of a router according to the embodiment.

FIG. 10 is a functional block diagram of a router according to this embodiment. Because the routers 2000a to 2000c are identical, the router 2000a is explained as an example.

As shown in the figure, the router 2000a includes input ports 2101 to 2102, control packet separating units 2201 to 2202, a control unit 2300, a switch 2400, a VLAN granting units 2501 to 2502, control packet multiplexing units 2601 to 2602, and output ports 2701 to 2702. The input ports 2101 to 2102 receive packets. Although two input ports are shown in the figure, a larger number of input ports may be provided.

The control packet separating units 2201 to 2202 determine whether packets received by the input ports 2101 to 2102 are control packets. If the packets are control packets, the control packet separating units 2201 to 2202 pass the packets to the control unit 2300. If the packets are not control packets, the control packet separating units 2201 to 2202 pass the packets to the switch 2400. There is one control packet separating unit for each input port. In a usual router, a control packet separating unit passes only a layer 3 control packet (e.g., a control packet of the RIP) to a control unit. However, the control packet separating units 2201 to 2202 also pass a layer 2 control packet (e.g., a control packet of the MSTP) to the control unit 2300.

The control unit 2300 controls the entire router 2000a. The control unit 2300 mainly performs processing such as routing control to packets identified as control packets by the control packet separating units 2201 to 2202. The control unit 2300 also gives instruction to pass a control packet for which the processing is complete, or a control packet generated anew, to the control packet multiplexing units 2601 to 2602, and then output the control packet from the output ports 2701 to 2702. A detailed constitution of the control unit 2300 is explained separately with reference to FIG. 11.

The switch 2400 outputs packets received from the control packet separating units 2201 to 2202 to an appropriate output port. The VLAN granting units 2501 to 2502 grant a VLAN tag to a packet outputted by the switch 2400 as required. There is one VLAN granting unit for each output port. Specifically, when networks at an output destination are multiple layer 2 networks, the VLAN granting units 2501 to 2502 grant a VLAN tag of a VLAN that is determined by the control unit 2300 as having a shortest route.

The control packet multiplexing units 2601 to 2602 multiplex a control packet outputted from the control unit 2300, and normal packets transmitted through the VLAN granting units 2501 to 2502. There is one control packet multiplexing unit for each output port. The output ports 2701 to 2702 transmit packets. Although two output ports are shown in the figure, a larger number of output ports may be provided.

Figure 11:
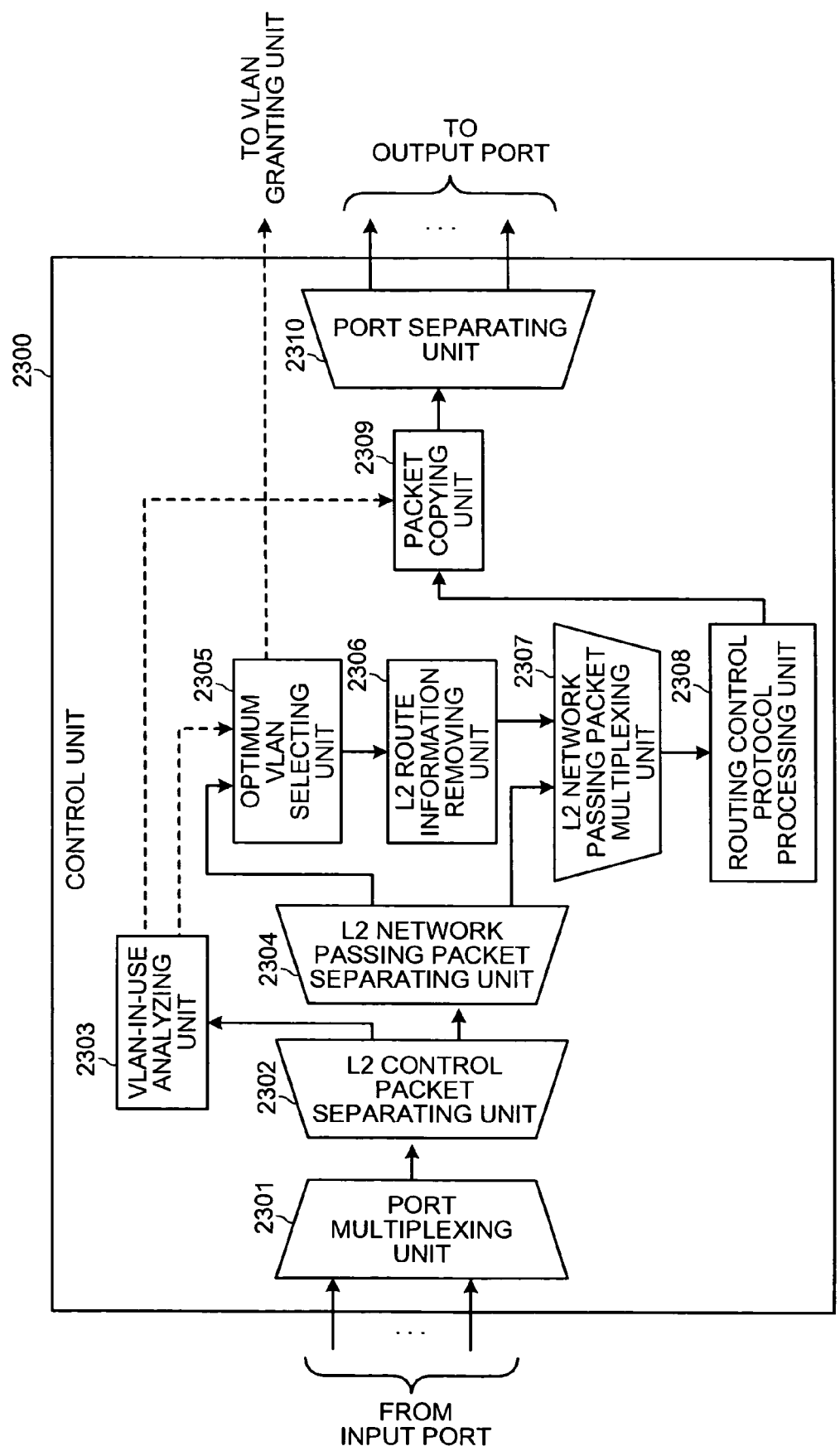
FIG. 11 is a functional block diagram of a control unit shown in FIG. 10.

FIG. 11 is a functional block diagram of the control unit 2300 shown in FIG. 10. As shown in the figure, the control unit 2300 includes a port multiplexing unit 2301, a layer 2 (L2) control packet separating unit 2302, a VLAN-in-use analyzing unit 2303, a layer 2 (L2) network passing packet separating unit 2304, an optimum VLAN selecting unit 2305, a layer 2 (L2) route information removing unit 2306, a layer 2 (L2) network passing packet multiplexing unit 2307, a routing control protocol processing unit 2308, a packet copying unit 2309, and a port separating unit 2310.

The port multiplexing unit 2301 multiplexes packets received by the input ports 2101 to 2102 and identified as control packets by the control packet separating units 2201 to 2202, and passes the packets to the layer 2 control packet separating unit 2302. The layer 2 control packet separating unit 2302 determines whether the packets passed are layer 2 control packets. If the packets are layer 2 control packets, the layer 2 control packet separating unit 2302 passes the packets to the VLAN-in-use analyzing unit 2303. If the packets are not layer 2 control packets, the layer 2 control packet separating unit 2302 passes the packets to the layer 2 network passing packet separating unit 2304.

The VLAN-in-use analyzing unit 2303 analyzes a state of a VLAN of the layer 2 network connected to an input port, which has received the control packet, based on the layer 2 control packets. The VLAN-in-use analyzing unit 2303 notifies a result of the analysis to the optimum VLAN selecting unit 2305 and the packet copying unit 2309.

In the route selection system according to this embodiment, a control packet for routing control is transmitted to respective VLANs set in the layer 2 network, and a VLAN forming an optimum route is selected from the layer 2 route information included in the control packet received. Therefore, the packet copying unit 2309 that replicates control packets to be transmitted to the respective VLANs, and the optimum VLAN selecting unit 2305 that compares control packets passing through the respective VLANs, are required to know in advance what kinds of VLANs are set in the layer 2 network.

The layer 2 network passing packet separating unit 2304 determines whether a packet has passed through the layer 2 network. If the packet has passed through the layer 2 network, the layer 2 network passing packet separating unit 2304 sends the packet to the optimum VLAN selecting unit 2305. If the packet has not passed through the layer 2 network, the layer 2 network passing packet separating unit 2304 sends the packet to the layer 2 network passing packet multiplexing unit 2307. The layer 2 switch embeds layer 2 route information in the packet that has passed through the layer 2 network. It is necessary for the optimum VLAN selecting unit 2305 to determine an optimum route.

The optimum VLAN selecting unit 2305 selects a VLAN forming an optimum route in the layer 2 network connected to an input port that has received the packet, based on the layer 2 route information embedded in the control packet, and notifies the VLAN granting units 2501 to 2502 of the VLAN selected.

The optimum VLAN selecting unit 2305 passes to the layer 2 route information removing unit 2306, only those control packets that have passed through the VLAN having the optimum route, from among control packets received. In the route selection system according to this embodiment, a layer 3 routing control packet is replicated by the number of VLANs, and transmitted. Because the optimum VLAN selecting unit 2305 disposes of control packets other than control packets that have passed through the VLAN forming the optimum route, it is possible to limit the number of control packets processed by the routing control protocol processing unit 2308, to the original number.

The layer 2 route information removing unit 2306 removes the layer 2 route information included in a control packet. In the route selection system according to this embodiment, the layer 2 route information is embedded in an unused part of the layer 3 routing control packet. However, if the route information is left as is, deficiency is likely to occur in the existing routing control process. Thus, the layer 2 route information removing unit 2306 removes the layer 2 route information to return the control packet to a state of a usual control packet.

The layer 2 network passing packet multiplexing unit 2307 multiplexes a packet outputted from the layer 2 route information removing unit 2306, and a packet, which has not passed through the layer 2 network, outputted from the layer 2 network passing packet separating unit 2304. The routing control protocol processing unit 2308 performs routing control process as is performed by a general router.

When a transmission destination of a control packet sent by the routing control protocol processing unit 2308 is the layer 2 networks made multiple by VLANs, the packet copying unit 2309 replicates a control packet by the number of the VLANs, and gives VLAN tags to the packets replicated. The port separating unit 2310 outputs a packet received from the packet copying unit 2309 to an appropriate output port.

Figure 12:
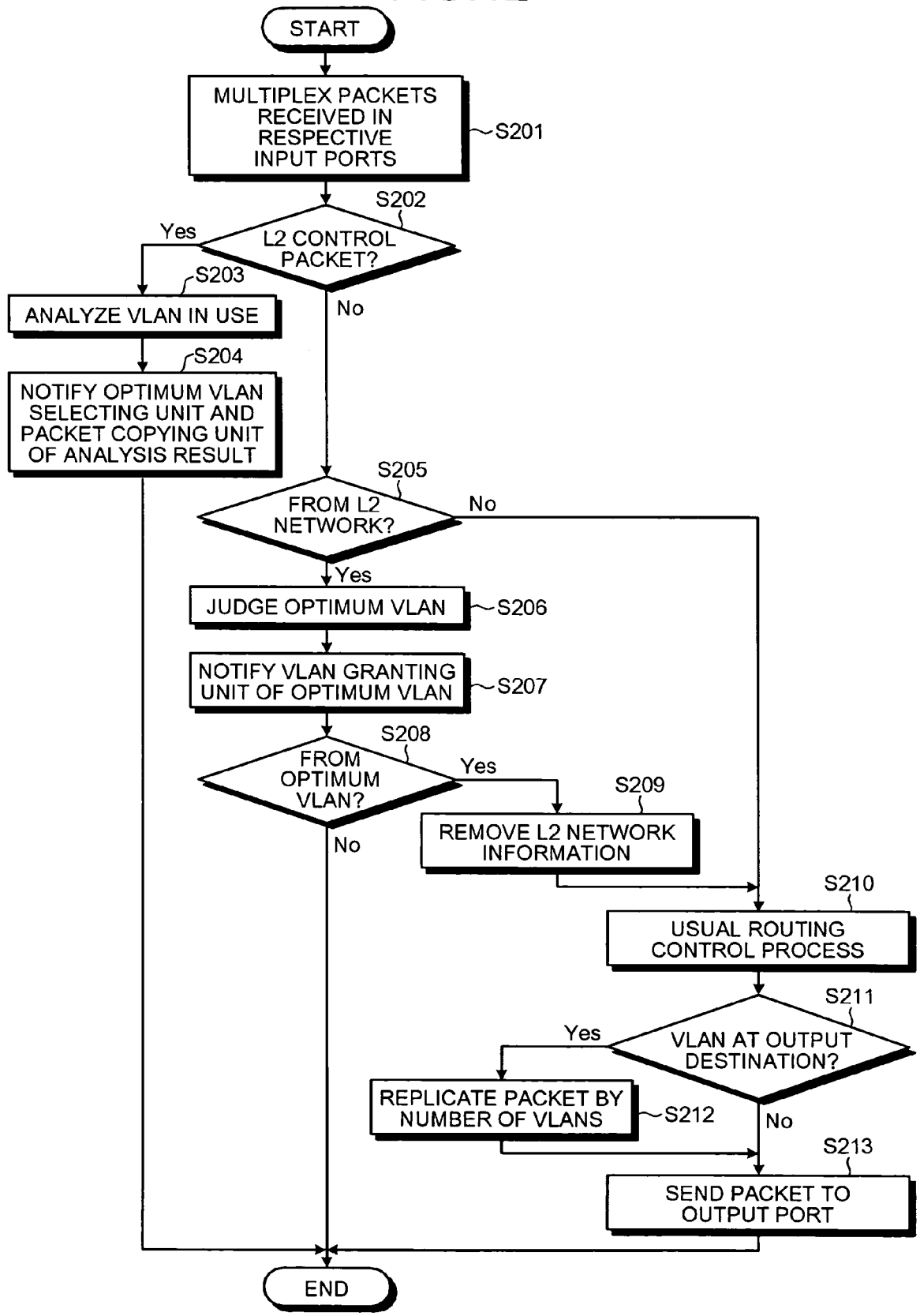
FIG. 12 is a flowchart of a process procedure performed by the control unit shown in FIG. 10.

FIG. 12 is a flowchart of a process procedure of the control unit 2300 shown in FIG. 10, when a control packet is received. As shown in the figure, the control unit 2300 multiplexes control packets received by the input ports 2101 to 2102 in the port multiplexing unit 2301 (step S201).

The layer 2 control packet separating unit 2302 in the control unit 2300 determines whether the control packets are layer 2 control packets. If the control packets are layer 2 control packets ("Yes" at step S202), the VLAN-in-use analyzing unit 2303 in the control unit 2300 analyzes VLANs in use (step S203), and notifies a result of the analysis to the optimum VLAN selecting unit 2305 and the packet copying unit 2309 (step S204).

If the controls packets are not layer 2 control packets ("No" at step S202), the layer 2 network passing packet separating unit 2304 in the control unit 2300 determines whether the control packets have passed through the layer 2 network. If the control packets have not passed through the layer 2 network ("No" at step S205), the control unit 2300 passes the packets to the layer 2 network passing packet multiplexing unit 2307.

If the packets have passed through the layer 2 network ("Yes" at step S205), the optimum VLAN selecting unit 2305 in the control unit 2300 acquires layer 2 route information included in the packets, to determine a VLAN that forms an optimum route (step S206). The control unit 2300 notifies the VLAN granting units 2501 to 2502 of the optimum VLAN (step S207).

If the packets have not passed through the optimum VLAN ("No" at step S208), the control unit 2300 disposes of the packets without sending the packets anywhere. If the packets have passed through the optimum VLAN ("Yes" at step S208), the layer 2 route information removing unit 2306 in the control unit 2300 removes the layer 2 route information (step S209). Then, the control unit 2300 passes the packets to the layer 2 network passing packet multiplexing unit 2307.

The layer 2 network passing packet multiplexing unit 2307 in the control unit 2300 multiplexes the packets received from the layer 2 network passing packet separating unit 2304, and the packets received from the layer 2 route information removing unit 2306, and sends the packets to the routing control protocol processing unit 2308. The routing control protocol processing unit 2308 in the control unit 2300 performs the usual routing control processing (step S210), and passes the processed packet to the packet copying unit 2309.

The packet copying unit 2309 in the control unit 2300 determines whether an output destination is the layer 2 networks made multiple by VLANs. If the output destination is the multiple layer 2 networks ("Yes" at step S211), the control unit 2300 replicates the packets by the number of the VLANs and grants VLAN tags to the packets (step S212). If the output destination is not the multiple layer 2 networks ("No" at step S211), the packet is not replicated. The control unit 2300 passes the packets to the port separating unit 2310 and outputs the packets from an appropriate output port (step S213).

Thus, the routers 2000a to 2000c according to this embodiment identify the layer 2 control packets passing through, analyze a state of VLANs of the layer 2 network from the packets, and transmit control packets for routing control to the respective VLANs. When the routers 2000a to 2000c receive control packets that have passed through the respective VLANs, the routers 2000a to 2000c determine a VLAN forming an optimum route based on the layer 2 route information embedded in the packets. Thereafter, while transmitting data to the layer 2 network, the routers 2000a to 2000c transmit packets to the optimum VLAN.

As described above, in this embodiment, the layer 2 switches 1000a to 2000c embed routing control information of the layer 2 network in the layer 3 control packet. The routers 2000a to 2000c determine a VLAN forming an optimum route from the layer 2 routing control information embedded in the layer 3 control packet. Thus, it is possible to always select an optimum route in the layer 2 network.

Note that, in the embodiment, although the communication device of the layer 3 is explained as the router, the communication device of the layer 3 may be the layer 3 switch. In addition, in the embodiment, the communication device of the layer 3 selects an optimum route. However, it is also possible that the layer 2 switch is provided with an optimum VLAN selecting function, an L2 route information removing function, a packet copying function, and the like, and that the communication device of the layer 2 located at an edge of the layer 2 network selects an optimum route.

According to the invention, it is possible to always select an optimum route in the layer 2 network.

Moreover, it is possible to reduce cost for management of a network.

Furthermore, it is possible to provide information for selecting an optimum route to a communication device outside and inside the layer 2 network.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network system comprising:
    a plurality of layer 2 communication devices that constitute a plurality of layer 2 networks that have loop configurations with blocks positioned differently; and
    a layer 3 communication device that performs communication through the plurality of layer 2 networks without communicating through the blocks, wherein
    each of the layer 2 communication devices includes
    an identifying unit to identify an Open Shortest Path First (OSPF) packet or a Routing Information Protocol (RIP) packet from among packets passing through the layer 2 communication device; and
    an embedding unit to embed routing control information for a layer 2 network in the OSPF packet or the RIP packet, and
    the layer 3 communication device includes
    a selecting unit to select, from the plurality of layer 2 networks that have the loop configurations with the blocks positioned differently, an optimum layer 2 network based on the routing control information for the layer 2 network embedded in the OSPF packet or the RIP packet; and
    a setting unit to set a packet to be transmitted to the optimum layer 2 network.

2. The network system according to claim 1, wherein the layer 3 communication device further includes
    a replicating unit to replicate the OSPF packet or the RIP packet by a number of the plurality of layer 2 networks that have the loop configurations with the blocks positioned differently, if the OSPF packet or the RIP packet is to be transmitted over the plurality of layer 2 networks.

3. A layer 3 communication device connected to a plurality of layer 2 networks that have loop configurations with blocks positioned differently, comprising:
    a selecting unit to select, from the plurality of layer 2 networks that have loop configurations with blocks positioned differently, an optimum layer 2 network based on routing control information for a layer 2 network embedded in an Open Shortest Path First (OSPF) packet or a Routing Information Protocol (RIP) packet by a layer 2 communication device; and
    a setting unit to set a packet to be transmitted to the optimum layer 2 network.

4. The layer 3 communication device according to claim 3, further comprising:
    an analyzing unit to receive a layer 2 control packet, and analyzes a state of multiplicity of the layer 2 networks, based on information in the layer 2 control packet received.

5. A route selecting method for a network system that includes a plurality of layer 2 communication devices that constitute a plurality of layer 2 networks that have loop configurations with blocks positioned differently, and a layer 3 communication device that performs communication through the plurality of layer 2 networks without communicating through the blocks, the method comprising:
    identifying, performed by the layer 2 communication device, an Open Shortest Path First (OSPF) packet or a Routing Information Protocol (RIP) packet from among packets passing through the layer 2 communication device;
    embedding, performed by the layer 2 communication device, routing control information for a layer 2 network in the OSPF packet or the RIP packet; and
    selecting, performed by the layer 3 communication device, from the plurality of layer 2 networks that have the loop configurations with the blocks positioned differently, an optimum layer 2 network based on the routing control information for the layer 2 network embedded in the OSPF packet or the RIP packet.

6. A layer 2 communication device comprising:
    an identifying unit to identify an Open Shortest Path First (OSPF) packet or a Routing Information Protocol (RIP) packet from among packets passing through the layer 2 communication device that constitutes a plurality of layer 2 networks that have loop configurations with blocks positioned differently; and
    an embedding unit to embed routing control information for a layer 2 network in the OSPF packet or the RIP packet, the routing control information enables the selecting, from the plurality of layer 2 networks, an optimum layer 2 network by a layer 3 communication device.

* * * * *